United States Patent
Nikshi et al.

(10) Patent No.: US 12,030,254 B2
(45) Date of Patent: Jul. 9, 2024

(54) SYSTEM AND METHOD FOR CONSTRUCTING STRUCTURES BY ADDING LAYERS OF EXTRUDABLE BUILDING MATERIAL USING A CONTROL FEEDBACK LOOP

(71) Applicant: ICON Technology, Inc., Austin, TX (US)

(72) Inventors: Walelign Messele Nikshi, Austin, TX (US); Brannon Veal, Austin, TX (US)

(73) Assignee: ICON TECHNOLOGY, INC., Austin, TX (US)

( * ) Notice: Subject to any disclaimer, the term of this patent is extended or adjusted under 35 U.S.C. 154(b) by 0 days.

(21) Appl. No.: 18/114,941

(22) Filed: Feb. 27, 2023

(65) Prior Publication Data
US 2023/0356471 A1 Nov. 9, 2023

Related U.S. Application Data

(63) Continuation of application No. 16/884,371, filed on May 27, 2020, now Pat. No. 11,590,711.

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| 7,641,461 B2 | 1/2010 | Khoshnevis |
| 11,167,444 B2 | 11/2021 | Le Roux |

(Continued)

FOREIGN PATENT DOCUMENTS

| CN | 109989585 A | 7/2019 |
| EP | 1711328 A1 | 10/2006 |

(Continued)

OTHER PUBLICATIONS

International Searching Authority, Notification of Transmittal of the International Search Report and the Written Opinion of the International Searching Authority, or the Declaration for International Application No. PCT/US2021/021704 mailed Jul. 1, 2021 (12 pages).

(Continued)

*Primary Examiner* — Yung-Sheng M Tsui
*Assistant Examiner* — Melody Tsui
(74) *Attorney, Agent, or Firm* — KOKKA & BACKUS, PC

(57) ABSTRACT

A system and method is provided to construct a structure using three dimensional printing of extrudable building material to a wall surface of a structure. According to one embodiment, a printing assembly is moveably disposed above the surface, and extrudable building material is applied from a nozzle onto the surface. One or more profilometers measure at periodic intervals along a geometric cross-section of a bead of extrudable building material. One or more controllers compare the measured cross-section to a predetermined, target cross section and one or more controllers periodically change, for example, the rate of application and/or the viscosity of the extrudable building material applied along the longitudinal axis. The nozzle direction can change, and the profilometers can be rotated (Continued)

about the nozzle along different longitudinal axes, or directions, depending on the wall locations being formed.

4 Claims, 8 Drawing Sheets

(51) Int. Cl.
    *B33Y 10/00*     (2015.01)
    *B33Y 30/00*     (2015.01)
    *B33Y 50/02*     (2015.01)

(56) References Cited

U.S. PATENT DOCUMENTS

| | | |
|---|---|---|
| 11,179,927 B2 | 11/2021 | Ford et al. |
| 11,590,711 B2 | 2/2023 | Nikshi et al. |
| 2016/0236414 A1 | 8/2016 | Reese et al. |
| 2017/0001379 A1* | 1/2017 | Long .................. B29C 64/393 |
| 2017/0050382 A1* | 2/2017 | Minardi ............ G05B 19/4099 |
| 2017/0056975 A1 | 3/2017 | Carter et al. |
| 2017/0136574 A1 | 5/2017 | Zenzinger et al. |
| 2017/0297095 A1 | 10/2017 | Zalameda et al. |
| 2017/0297097 A1* | 10/2017 | Gibson ................. B29C 64/386 |
| 2017/0365365 A1 | 12/2017 | White et al. |
| 2018/0071949 A1 | 3/2018 | Giles |
| 2018/0079153 A1 | 3/2018 | Ng et al. |
| 2018/0154484 A1 | 6/2018 | Hall |
| 2018/0326487 A1 | 11/2018 | Casper et al. |
| 2019/0240730 A1* | 8/2019 | Haider ................... B33Y 30/00 |
| 2020/0048893 A1 | 2/2020 | Martinez et al. |
| 2020/0130270 A1* | 4/2020 | Morris .................. B29C 64/295 |
| 2020/0147873 A1* | 5/2020 | Lewis ................... B29C 64/118 |
| 2020/0184632 A1* | 6/2020 | Crane ...................... G06T 7/586 |
| 2020/0230886 A1* | 7/2020 | Takano .................. B33Y 30/00 |
| 2020/0368848 A1* | 11/2020 | Birmingham ...... B23K 26/1464 |
| 2020/0368970 A1* | 11/2020 | Georgeson ........... B29C 64/209 |
| 2021/0107215 A1 | 4/2021 | Bauza et al. |
| 2021/0370609 A1 | 12/2021 | Nikshi et al. |
| 2021/0394272 A1 | 12/2021 | Jones et al. |
| 2022/0072620 A1* | 3/2022 | Widulle ................. B33Y 10/00 |
| 2022/0080663 A1* | 3/2022 | Leibig .................. B29C 64/321 |

FOREIGN PATENT DOCUMENTS

| | | |
|---|---|---|
| EP | 4158121 A1 | 4/2023 |
| WO | 2021242354 A1 | 12/2021 |

OTHER PUBLICATIONS

Tsui, Yung-Sheng M., Final Office Action mailed Aug. 25, 2022 for U.S. Appl. No. 16/884,371.
Tsui, Yung-Sheng M., Non-Final Office Action mailed Feb. 23, 2022 for U.S. Appl. No. 16/884,371.
Tsui, Yung-Sheng M., Non-Final Office Action mailed May 9, 2022 for U.S. Appl. No. 16/884,371.
Tsui, Yung-Sheng M., Notice of Allowance and Fee(s) Due mailed Oct. 26, 2022 for U.S. Appl. No. 16/884,371.

* cited by examiner

SYSTEM AND METHOD FOR CONSTRUCTING STRUCTURES BY ADDING LAYERS OF EXTRUDABLE BUILDING MATERIAL USING A CONTROL FEEDBACK LOOP

CROSS-REFERENCE TO RELATED APPLICATIONS

This application is a continuation application of U.S. patent application Ser. No. 16/884,371, filed on May 27, 2020, now U.S. Pat. No. 11,590,711 and titled, "SYSTEM AND METHOD FOR CONSTRUCTING STRUCTURES BY ADDING LAYERS OF EXTRUDABLE BUILDING MATERIAL USING A CONTROL FEEDBACK LOOP," all of which is herein incorporated by reference in its entirety for all purposes.

BACKGROUND

This disclosure is generally directed to the construction of structures (e.g., dwellings, buildings, etc.). More particular, this disclosure is directed to using a feedback loop to geometrically control the addition of layers of elongated beads of extrudable building material to a wall surface of the structure.

Structures (e.g., dwellings, buildings, sheds, etc.) may be manufactured with a multitude of different materials and construction methods. Among the materials commonly used in the construction of structures is concrete. For example, concrete may be utilized in the foundation of a structure and possibly in the construction of interior or exterior walls.

BRIEF SUMMARY OF THE DISCLOSURE

In one embodiment disclosed herein a system is provided for constructing a structure. The system can include a printing assembly moveably disposed on a gantry above a surface, such as foundation or a wall horizontal surface. A nozzle can be mounted on the printing assembly, and the nozzle can include an outlet through which extrudable building material exits to form a bead having a longitudinal axis about which a cross section of the bead is formed. The longitudinal axis is substantially parallel to and above the surface. A profilometer can be mounted on the printing assembly. The profilometer is preferably a non-contact optical profilometer, such as a laser profilometer comprising an emitter and a detector, such as a camera. The laser emitter may be configured to project a line of collimated light across at least a portion of a cross-section of the bead perpendicular to the longitudinal axis. The camera may be configured to collect the collimated light reflected from the bead as the bead is being formed when the nozzle mounted to the printing assembly is moved above the surface and along the longitudinal axis.

In other embodiments, the system can include a pair of first profilometers mounted on the printing assembly and spaced radially outward from and rotatable about the nozzle. The pair of first profilometers can project rays of collimated light co-planar to each other as projected lines disposed at substantially similar angles relative to the planar surface and inward toward the elongated axis. A second profilometer can also be employed and mounted on the printing assembly a radially spaced distance outward from the nozzle and rotatable around the nozzle. The second profilometer is spaced radially further outward from and between the pair of first profilometers, wherein the second profilometer projects a collimated line substantially parallel to the planar surface.

In communication with the profilometer, or profilometers, is one or more signal processors used to measure a height of the bead perpendicular from the surface, a width of the bead parallel to the surface and perpendicular to the bead height, a displacement of the bead above the surface as the extrudable building material is delivered from the nozzle. The signal processor can also measure a number of tears within the bead per unit length along the elongated axis, and a lateral roll of the bead beyond a predetermined amount perpendicular to the longitudinal axis.

A comparator may be used to compare the height, width and displacement of the bead to a predetermined target bead height, width and displacement. A bead quantity controller can be coupled to the comparator to change, depending on the results of the comparator output, a nozzle speed along the longitudinal axis, a nozzle height along the longitudinal axis, and a pump rate of the extrudable building material from an outlet of the nozzle. Another comparator can be used to compare the number of tears and the extent of the lateral roll of the bead to a predetermined target tear amount and a target roll amount. Depending on the results of the comparator output, a bead quality controller can be coupled to change an admixture and a water content of the extrudable building material that exits from an outlet of the nozzle.

According to another embodiment, a method is provided for adding layers of an elongated bead of extrudable building material to a wall surface of a structure. The method includes moving a nozzle while extruding the building material to form the bead upon the surface along a first axis. A cross section of the bead can be measured along the first axis, and the measured cross section can be compared to a predetermined target cross section. Depending on the comparing, a speed at which the nozzle moves along the first axis, a height of the nozzle above the surface, a rate at which the building material is extruded, and an admixture and water content of the building material can be changed. The nozzle can subsequently be moved along a second axis while rotating at least one optical measuring device about the nozzle to form and measure the bead placed along the second axis.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
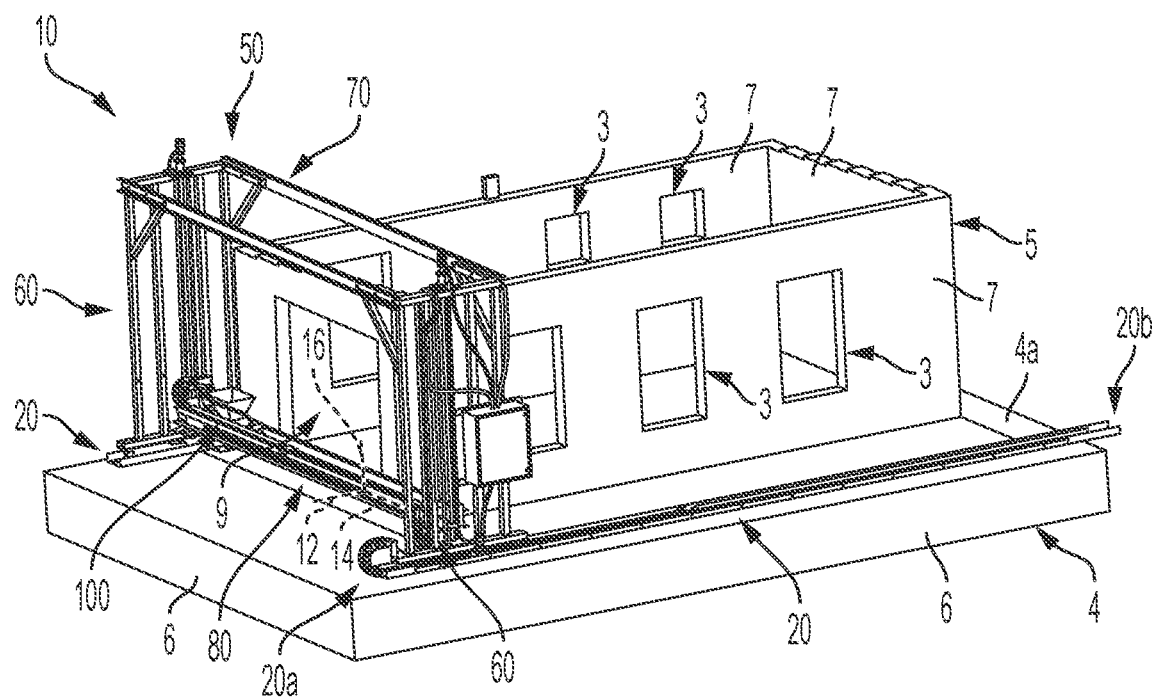
FIG. 1 is a perspective view of a construction system and a structure being constructed with stacked layers of elongated beads.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., x, y or z direction or central axis of a body, outlet or port), while the terms "radial" and "radially" generally mean perpendicular to the given axis. For instance, an axial distance refers to a distance measured along or parallel to the axis, and a radial distance means a distance measured perpendicular to the axis.

As used herein, the terms "about," "approximately," "substantially," "generally," and the like mean plus or minus 10% of the stated value or range. In addition, as used herein, an "extrudable building material" refers to a building material that may be delivered or conveyed through a conduit (e.g., such as a flexible conduit) and extruded (e.g., via a nozzle or pipe) in a desired location. In some embodiments, an extrudable building material includes a cement mixture (e.g., concrete, cement, etc.). Further, as used herein, the term "computing device" refers to any suitable device (or collection of devices) that is configured to execute, store, and/or generate machine readable instructions (e.g., non-transitory machine readable medium). The term may specifically include devices, such as, computers (e.g., personal computers, laptop computers, tablet computers, smartphones, personal data assistants, etc.), servers, controllers, etc. A computing device may include a processor and a memory, wherein the processor is to execute machine readable instructions that are stored on the memory.

As previously described above, structures (e.g., dwellings, buildings, sheds, etc.) may be manufactured with a multitude of different materials and construction methods. Traditionally, a building (e.g., a dwelling) may be constructed upon a composite slab or foundation that comprises concrete reinforced with re-bar or other metallic materials. The structure itself may then be framed (e.g., with wood and/or metal framing members), and then an outer shell and interior coverings (e.g., ply-wood, sheet rock, etc.) may be constructed around the structural framing. Utilities (e.g., water and electrical power delivery as well as vents and ducting for air conditioning and heating systems) may be enclosed within the outer shell and interior covers along with insulation. This method of designing and constructing a structure is well known and has been successfully utilized in constructing an uncountable number of structures; however, it requires multiple constructions steps that cannot be performed simultaneously and that often require different skills and trades to complete. As a result, this process for designing and constructing a structure can extend over a considerable period (e.g., 6 months to a year or more). Such a lengthy construction period is not desirable in circumstances that call for the construction of a structure in a relatively short period of time.

Accordingly, embodiments disclosed herein include construction systems, methods of construction, and even methods for structure design that allow a structure (such as a personal dwelling) to be constructed in a fraction of the time associated with traditional construction methods. In particular, embodiments disclosed herein utilize additive manufacturing techniques (e.g., three dimensional (3D) printing) in order to produce a structure more quickly, economically, and in a systematic manner.

Figure 2:
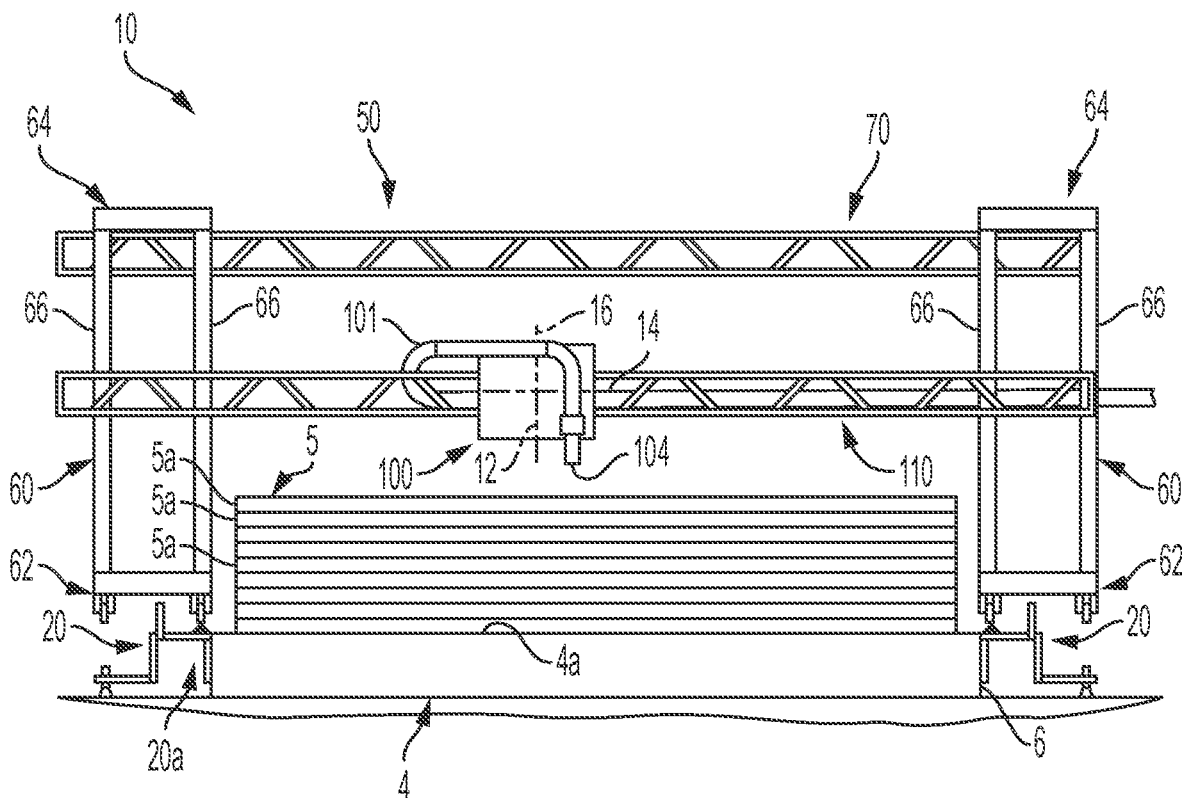
FIG. 2 is front view of the construction system and stacked layers of elongated beads of FIG. 1.

Referring now to FIGS. 1 and 2, a construction system 10 according to some embodiments is shown. In this embodiment, construction system 10 can include a pair of rail assemblies 20, a gantry 50 movably disposed on rail assemblies 20, and a printing assembly 100 movably disposed on gantry 50. As will be described below, construction system 10 is configured to form a structure, such as for example the structure shown in FIG. 1, via additive manufacturing, specifically 3D printing. In particular, construction system 10 (via rail assemblies 20 and gantry 50) is configured to controllably move or actuate printing assembly 100 relative to the foundation 4 along each of a plurality of orthogonal movement axes or directions 12, 14, 16 such that printing assembly 100 may controllably deposit an extrudable building material in a plurality of vertically stacked layers 5a to form structure 5. As shown in FIG. 2, axes 12, 14, 16 are each orthogonal to one another—with axis 12 being orthogonal to both axes 14, 16, axis 14 being orthogonal to axes 12 and 16, and axis 16 being orthogonal to axes 12 and 14. In addition, the origin (not shown) of axes 12, 14, 16 is generally disposed at the printing assembly 100.

To ensure the clarity of the following discussion of construction system 10, the details of example structure 5 will be quickly described. In particular, as shown in FIG. 1, structure 5 includes a plurality of walls 7, a plurality of windows 3 extending through the walls 7, and a door frame 9 also extending through one of the walls 7. Structure 5 is formed upon a foundation 4. In this embodiment, foundation 4 is a reinforced concrete slab that is formed by first building an exterior form or mold (not shown), then placing a plurality of metallic rods (e.g., rebar) within the form in a desired pattern (e.g., in a grid pattern), and finally filling the mold with liquid or semi liquid concrete mixture. Once the concrete has sufficiently dried and/or cured (e.g., such that the foundation 4 may support the weight of structure 5), structure 5 may be constructed (e.g., printed) atop foundation 4 utilizing construction system 10. As shown in FIG. 1, foundation includes a planar (or substantially planar) top surface 4a, and a perimeter 6. In some embodiments, axes 12 and 14 form or define a plane that is parallel to top surface 4a of foundation, and axis 16 extends in a normal direction from top surface 4a. Thus, in instances where top surface 4a is substantially level (or perpendicular to the direction of gravity), axes 12, 14 define a level, horizontal or lateral plane, and axis 16 defines the vertical direction.

Referring to FIG. 2, in this embodiment, each rail assembly 20 is disposed on top surface 4a of foundation and includes a first end 20a, and a second end 20b opposite first end 20a. Axes 25 of rail assemblies 20 are parallel and radially spaced from one another across top surface 4a such that first ends 20a and second ends 20b of rail assemblies 20 are generally aligned with one another across top surface 4a. In addition, each of the elongated axes of rail assemblies 20 extend parallel to axis 12 (and thus, each axis of the rail assemblies 20 also extends in a direction that is perpendicular to the direction of axis 14 and the direction of axis 16). As best shown in FIG. 2, each rail assembly 20 includes an elongated channel member extending axially between ends 20a, 20b along the rail assembly axis that includes a pair of axially extending walls defining a recess extending therebetween. Further description of the rail assembly is set forth in U.S. patent application Ser. No. 16/230,585, incorporated herein by reference in its entirety.

Referring again to FIGS. 1 and 2, gantry 50 generally includes a pair of vertical support assemblies 60, an upper bridge assembly 70 spanning between vertical support assemblies 60, and a trolley bridge assembly 80 also spanning between vertical support assemblies 60, below upper bridge assembly 70. Each of the vertical support assemblies 60 is movably coupled to a corresponding one of the rail assemblies 20 so that vertical support assemblies 60 may traverse along axis 12 during operations. In addition, trolley bridge assembly 80 is movably coupled to each of the vertical support assemblies 60 so that trolley bridge assembly 80 may traverse along axis 16 during operations. Each of these components, and their operation is further described in U.S. patent application Ser. Nos. 16/230,585 and 16/294,714 incorporated herein by reference in its entirety.

Figure 4:
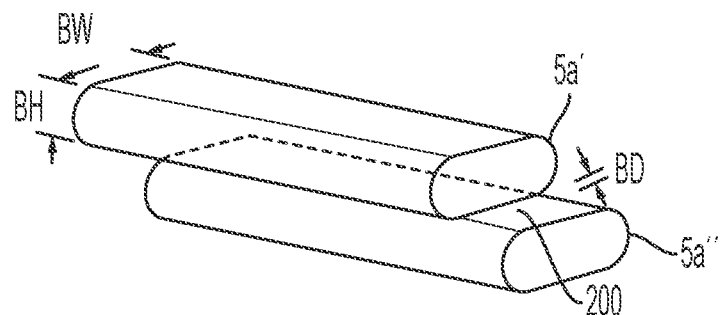
FIG. 4 is a perspective view of a partial elongated bead shown having a bead width, bead height and bead displacement arranged on a surface of a wall that can include an underlying, pre-existing bead.

Referring to FIG. 4, each vertical support assembly 60 includes a longitudinal axis, a first or lower support girder 62, and a second or upper support girder 64 axially spaced from lower support girder 62 along its longitudinal axis. In addition, vertical support assembly 60 includes a plurality of support legs 66 extending axially between girders 62, 64 with respect to the longitudinal axis. In this embodiment, longitudinal axis extends in the vertical direction, or along the direction of the force of gravity, and thus, axis of each vertical support assembly 60 is parallel to axis 16, and support legs 66 of each vertical support assembly 60 extend vertically between the corresponding girders 62, 64.

Although not shown, yet described in U.S. patent application Ser. Nos. 16/230,585 and 16/294,714, each vertical support assembly 60 further includes a pair of roller assemblies coupled to lower support girder 62. Each roller assembly includes a corresponding roller that engages with an angle member within the corresponding rail assembly 20. A lateral actuation assembly can be coupled between each vertical support assembly 60 and the corresponding rail assembly 20 (that is, there is a corresponding lateral actuation assembly coupled between each vertical support assembly 60 and corresponding rail assembly 20 within construction system 10). A driver can be used to move the lateral actuation assembly. The actuation of one or more drivers cause movement or translation of gantry 50 along axis 12 relative to foundation 4.

Upper bridge assembly 70 can include a pair of girders that are mounted to and span between upper girders 64 of vertical support assemblies 60. Vertical support assemblies 60 are secured to one another via upper bridge assembly 70, so that each of the vertical support assemblies 60 are moved together about top surface 4a of foundation 4 along axis 12 during printing operations. A trolley bridge assembly 80 is coupled to and spans between vertical support assemblies 60. Printing assembly 100 is movably coupled to girder 80 such that printing assembly 100 is configured to traverse along axis 14 during operations. Further details of the printing assembly 100 movement operation upon trolly bridge assembly or girder 80 and above a horizontal surface is described in U.S. patent application Ser. Nos. 16/230,585 and 16/294,714.

Printing assembly 100 generally includes a supply conduit 101 or nozzle terminating as an outlet 104. Nozzle 101 is configured to deliver an extrudable building material (e.g., a cement mixture) from a source, which may comprise any suitable tank or vessel that is configured to contain a volume of extrudable building material therein. For example, in some embodiments, the source may comprise a tank, a cement mixer (e.g., such as that found on a stand-alone cement mixer or on a cement truck), or other suitable container. The source may be disposed immediately adjacent foundation 4 and gantry 50, or may be relatively remote from foundation 4 and gantry 50. Nozzle 101 comprises a hose; however, other suitable conduits or channels for delivering the extrudable building material from the source may be used in other embodiments (e.g., pipes, open channels, tubing, etc.). Extrudable building materials is premixed with an ad mixture and water, and then pumped through nozzle 101 and out from outlet 104. The pump assembly described can include a pump housing and a screw to pump the material, after being mixed, from outlet 104.

During operations, an extrudable building material is flowed from a source via a pump that is proximate the source and adjacent (and potentially distal) to foundation 4. The building material is then conducted along supply conduit 101 and emitted from outlet 104 so that is may be deposited at a desired location along foundation 4 (or on previously deposited building material placed horizontally along a wall, exterior or interior, of a structure).

Figure 3:
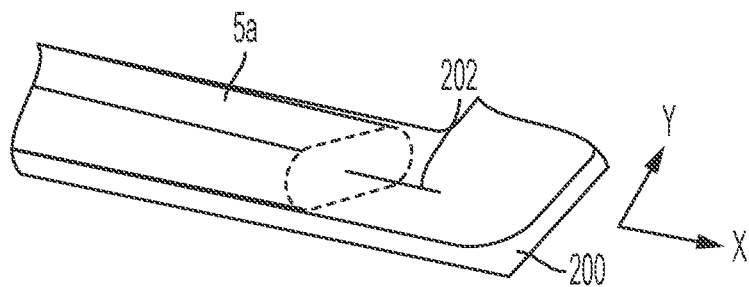
FIG. 3 is a perspective view of a partial elongated bead formed in two dimensions on a surface of a wall or foundation.

Turning now to FIG. 3 a partial perspective view of bead 5a of extrudable building material is shown placed on a substantially planar upper horizontal surface 200 by the printing assembly 100 of FIGS. 1 and 2. Bead 5a preferably comprises an oval cross-section shown in dashed line, and extends along a longitudinal axis 202. The longitudinal axis can change direction depending on the wall layout of the structure 5. For example, the longitudinal axis 202 can extend along an x-axis and then continue as a unibody bead in an orthogonal direction along a y-axis as shown in FIG. 3. If the wall design is curved, rather than at right angles, the bead 5a can follow the curve from one axis to another axis that need not be orthogonal to each other.

FIG. 4 illustrates horizontal surface 200 as an upper surface of an underlying, pre-existing bead 5a". During a subsequent pass of the printing assembly 100, another bead 5a' is stacked on top of the underlying bead 5a". All beads 5a preferably have a consistent bead height (BH) and a consistent bead width (BW). Bead height is measured in a first dimension within the cross-section of bead 5a, and bead width if measured in a second dimension perpendicular to the first dimension within the cross-section of the bead. A displacement of the bead (BD) is measured as the bead exits the outlet 104 (FIG. 2), and that measurement is taken as the distance above the surface on which the bead is placed. As noted above, the surface 200 can be an upper surface of foundation 4 or an upper surface of an underlying bead 5a". If the outlet 104 is moved across the surface 200 a greater distance above surface 200, then the bead 5a exiting the outlet 104 will be corresponding large. It is desirable that the outlet 104 be arranged as close as possible to surface 200, but not too close as to contact the surface and therefore the bead displacement should be as close as possible to a target bead displacement. If the bead displacement is too large, then the bead 5a will not form as an oval cross-section directly over surface 200. The same applies to bead width and bead height. Both bead width and bead height must be substantially uniform along the longitudinal axis 202 (FIG. 3) so the wall interior surface and wall exterior surface is uniform both vertically and horizontally across multiple stacked beads 5a.

Figure 5:
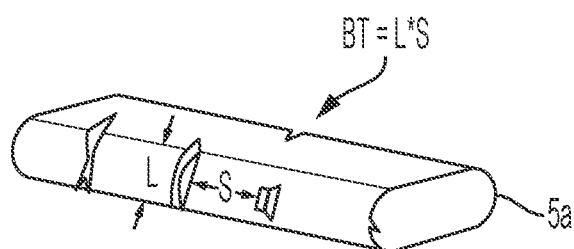
FIG. 5 is a perspective view of a partial elongated bead shown having a number of bead tears per unit length within the extruded building material.

FIG. 5 illustrates what occurs if the extruded building material has an improper viscosity. For example, if the material is extruded with too much ad mixture of dry concrete or cement, the bead 5a will form with separations therein. Those separations are henceforth referred to as bead tears (BTs), and as the "dryness" of the extruded material increases the number of bead tears can increase per predetermined unit length (e.g., 5 cm length along the longitudinal axis 202). Other facts can increase the number of bead tears, such as environmental factors (e.g., humidity, sunlight) during the printing process that forms the beads 5a from nozzle 101. As shown, the number of beads per unit length can be quantified, along with the length L of each bead tear and the spacing S between bead tears. The number of bead tears depends first on quantifying a bead tear is a bead tear, and then counting the number of bead tears per unit length. If, for example, a bead tear is less than a predetermined target length or a pair of bead tears is less than a predetermined spacing, then a bead tear will not be counted, or registered. The length L must surpass a threshold, and the spacing S must surpass a threshold before the bead tear or tears are counted. A bead tear BT must then surpass a product of length L and spacing S, as shown, in order for the bead tear or tears to be counted.

Figure 6:
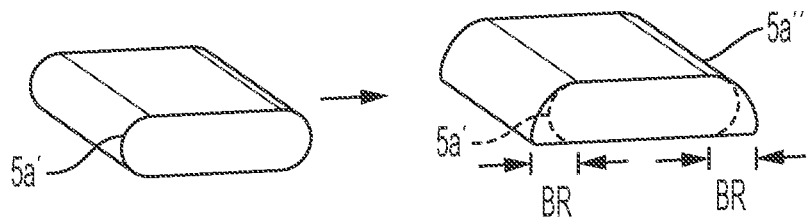
FIG. 6 is a perspective view of a partial elongated bead shown in cross-section having a bead roll amount from a normal lateral cross-section.

FIG. 6 illustrates what occurs when the extruded bead material is extruded too wet, or has too little dry ad mixture of dry cement. As the extruded material exits the outlet 104 (FIG. 2) too wet, or the print environment is too wet, the bead will undergo a bead roll (BR). Instead of the cross section of the bead 5a' appearing as shown to the left in FIG. 6, if there is too much water in the extruded bead, the lateral extents will spread outward to form bead 5a". The amount of lateral extents beyond the normal amount is shown as the bead roll, and a large bead roll is undesirable not only from a non-uniformity standpoint but also is cosmetically undesirable on the inner or outer surface of the wall. Along with bead tear, bead roll must be carefully monitored and compared to a predetermined target amount to reach a desirable bead viscosity and outer bead geometry that is uniform along the longitudinal axis, bead after stacked bead.

Figure 7:
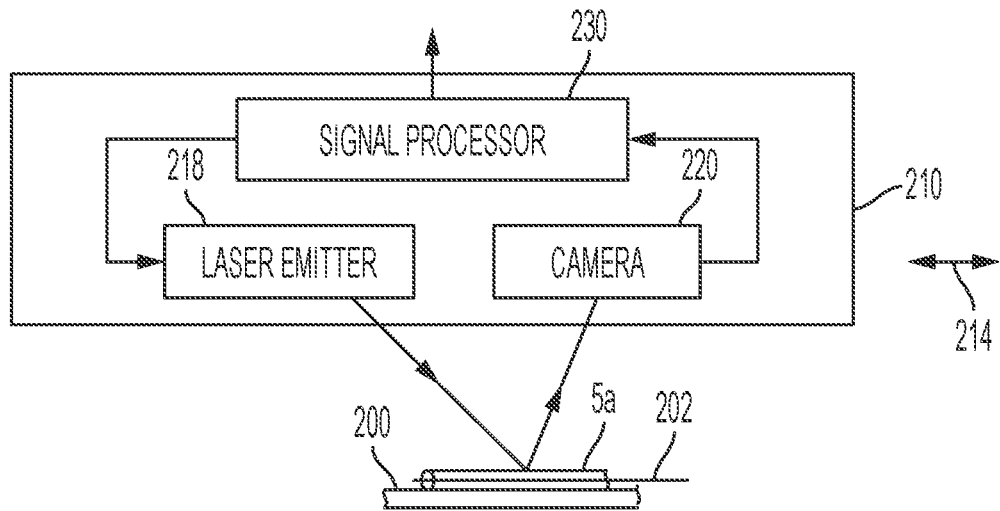
FIG. 7 is a block diagram of an optical profilometer arranged above an elongated bead formed on a substantially horizontal surface.

FIG. 7 illustrates a profilometer 210 configured to monitor the viscosity and outer bead geometry as the bead 5a is extruded along its longitudinal axis 202 upon a substantially horizontal upper surface 200. Profilometer 210 is preferably an non-contact optical profilometer, such as a laser profilometer 210 that moves 214 parallel to the longitudinal axis 202 along with the nozzle 101 (FIG. 2), a spaced distance from the nozzle 101 and downstream of the bead 5a placement. Laser profilometer 210 is a scanning laser line profilometer that is configured as a two dimensional laser line scanner that when moved along longitudinal axis 202 scans a three dimensional profile of bead 5a. During operations a controller moves the scanner along a pre-determined path in unison with the printing assembly 100 movement. The controller combines multiple frame outputs to develop a three dimensional profile in the form of a three dimensional point cloud.

Profilometer 210 comprises a laser line emitter 218. The emitter 218 emits a laser line upon the bead 5a. Reflections from the bead 5a are imaged by an optical detector, or camera 220. The emitter 218 and detector 220 comprise data ports or channels to allow for emitter 218 control of the waveform, or ray, and reporting from the camera detector 220. The ray from emitter 218 will be discussed below in the context of the direction, wavelength, and configuration culminating in a line across different portions extending along the bead as the bead is being formed to generate a three dimensional point cloud produced from signal processor 230. There can be one signal processor 230 for each profilometer 210, or the camera output from each profilometer can be linked across profilometers to allow use of only a single signal processor 230 across multiple profilometers 210, if desired. Regardless of how the signal processors 230 are linked, bead outer geometry (bead height, width and displacement) and viscosity (bead tear and roll) measurement data are generated from processor(s) 230.

Figure 8:
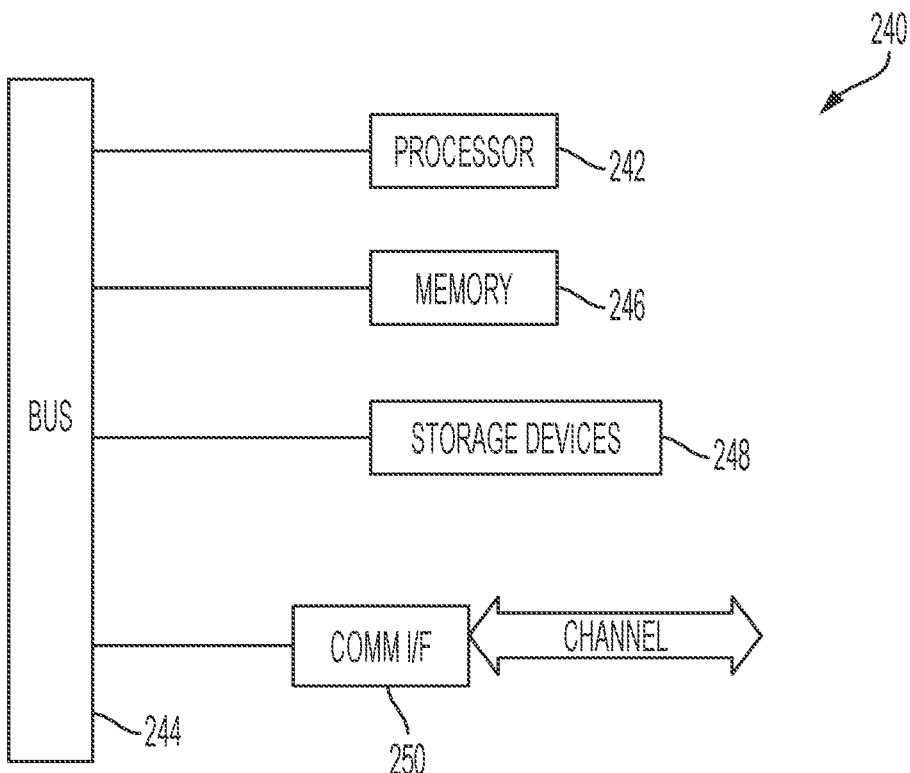
FIG. 8 is a block diagram of a computing module that can be used as one or more signal processors, comparators and controllers to implement loop feedback control of the bead cross section geometry as well as the outer surface bead tear and bead roll characteristics.

FIG. 8 illustrates a computer module 240 to provide computing or processing capabilities found within a mainframe, workstation, server, desktop, laptop or notebook computer, handheld computing devices, etc. Computer module 240 might be available in other electronic devices such as digital cameras, cellular telephones, portable computing devices, modems, routers, WAPs, terminals and other electronic devices, all of which include some form of processing and data storage capability. Computer module 240 operates to provide signal processing and controller capabilities of signal processor(s) 230 (FIG. 7), the bead quality and quantity controllers, the printer assembly controller and position and flowrate generators described below in FIG. 17. and printer assembly controller.

Computer module 240 may include, one or more processors 242. Processor 242 might be implemented using a general-purpose or special purpose instruction set found in microprocessor execution engines, or other configurable control logic. Processor 242 may be coupled to a bus 244, or other communication medium, to facilitate interaction with other components of computer module 240. Computer module 240 might also include one or more memory modules, simply referred to as memory 246. Memory 246 might be a random access memory, or other dynamic memory to store information and instructions to be executed by processor 242. Memory might also include a read only memory or other static storage mechanism. Computer module 240 might also include one or more various forms of information storage devices 248, such as a media drive and other mechanisms to support fixed or removable storage media. Computer module 240 might also include a communications interface 250. Communications interface 250 might be used to allow software and data to be transferred between computer module 240 and external devices. Examples of communications interface 250 might include wired or wireless communication capabilities, modem or network interface, a communications port such as a USB port, Bluetooth or WiFi interface, IR or RF link, optical link, etc. The interface allows any form of data or instructions to be sent to and from the computer module 240 (signal processor, controller, generator, comparator, material mixer, nozzle, valve, driver and pump, etc. described herein). The processor or processors 242 of module 240 executes any machine-readable instruction to perform the functionality described herein. A suitable power source may also be included within or coupled to module 240, or components of module 240. The power source may comprise any suitable source of electrical power such as, for example, a battery, capacitor, a converter or a local power grid, etc.

Figure 9:
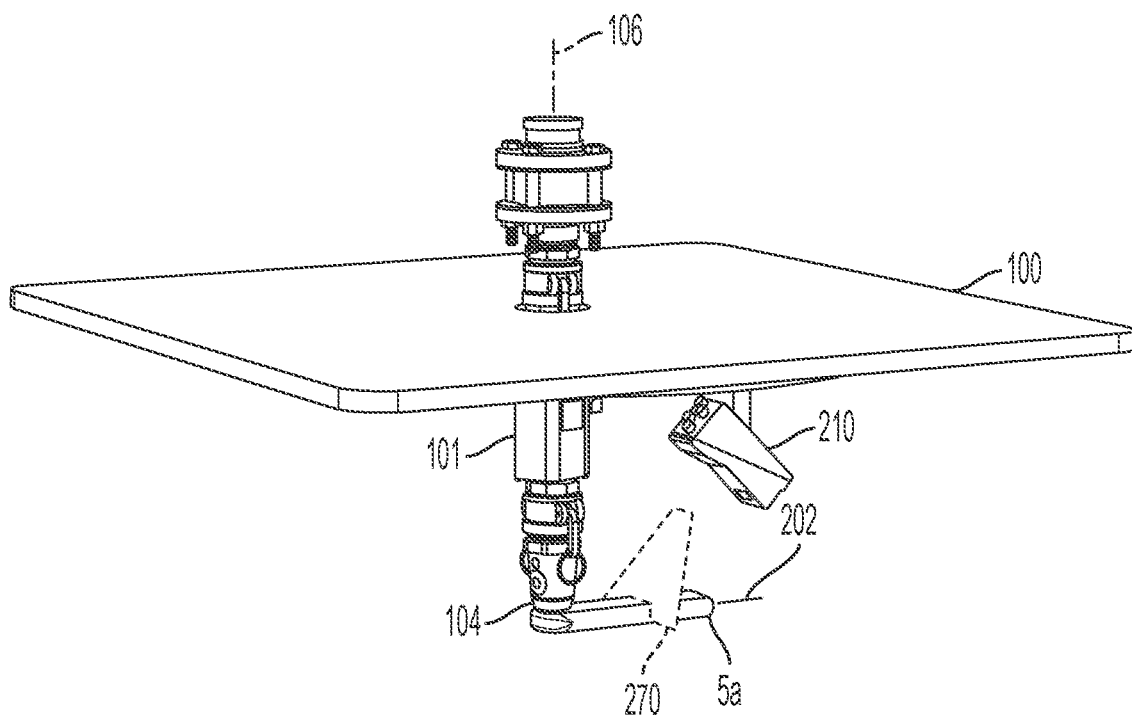
FIG. 9 is a top perspective view of the nozzle, nozzle outlet and profilometer mounted to a bottom surface of the printing assembly.

Referring now to FIG. 9, a top perspective view of the nozzle 101 is shown mounted on the printing assembly 100. The nozzle 101 is secured to the printing assembly 100 so that if the printing assembly 100 moves, the nozzle 101 moves along with and in unison with the printing assembly 100. The nozzle 101 is configured with a nozzle outlet 104 at a distal end of the nozzle, and the nozzle 101 radially surrounds a central axis 106. Bead 5a is extruded having a cross-section midpoint aligned with the central axis 106. Mounted on a lower surface of the printing assembly 100 is a profilometer 210. Shown in FIG. 10 bottom perspective view, the profilometer 210 is mounted to a circular member 260 that is configured to rotate 262 around nozzle 101, and specifically the substantially vertical central axis 106 of nozzle 101. The mounting arm 267 of profilometer 210 is also secured to a member 268 that is rotatably secured to circular member 260, and rotates around a substantially vertical central axis of the mounting arm 267.

The light emitted from the laser emitter 218 of profilometer 210 is shown as collimated light output as a line 270 projected as a ray that fans outward from the emitter 218. The line 270 extends across a cross section of bead 5a depicted by camera 220 as a two dimension cross section slice of bead 5a. However, as the nozzle 101 moves with the printing assembly 100 in a line parallel to and above the longitudinal axis 202 of the forming bead 5a, the camera 220 along with the signal processor computes a three dimension point cloud described below in reference to FIG. 13b. Profilometer 210 must rotate on printing assembly 100 as the nozzle 101 changes direction so that profilometer 210 will always trail the cross-section midpoint of the forming bead 5a and remain centered along the longitudinal axis 202 in the new direction.

Figure 10:
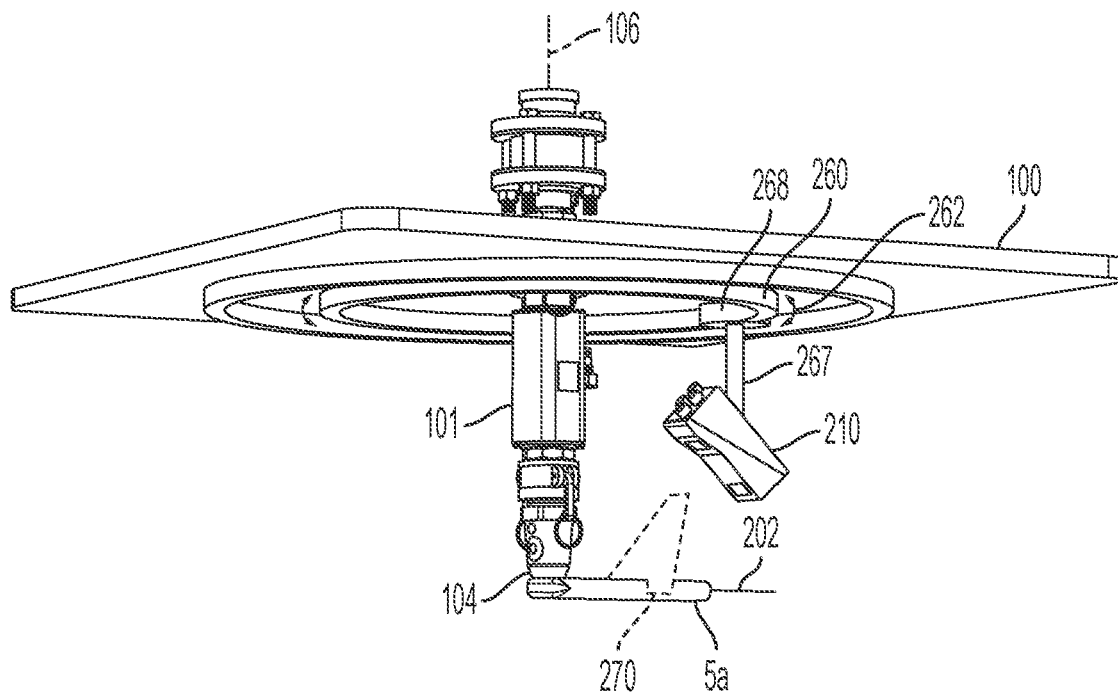
FIG. 10 is a bottom perspective view of the nozzle, nozzle outlet and profilometer mounted to the printing assembly such that the profilometer is rotatably mounted to the printing assembly around a central axis of the nozzle.
Figure 11:
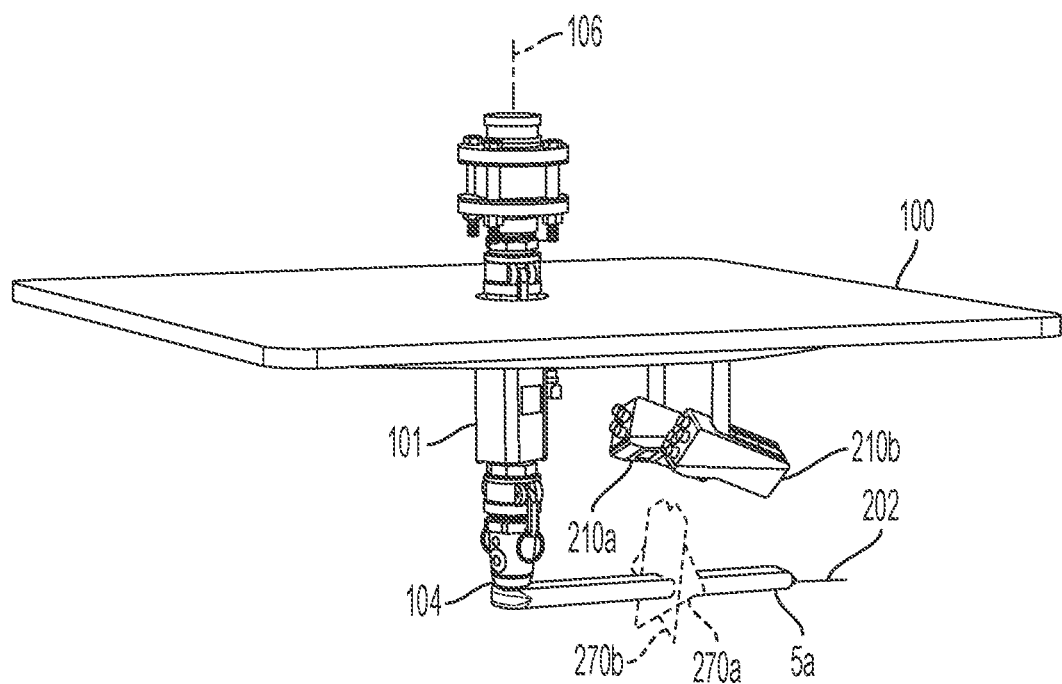
FIG. 11 is a top perspective view of the nozzle, nozzle outlet and a first pair of profilometers mounted to a bottom surface of the printing assembly.

FIG. 11 is a top perspective view of the nozzle 101, nozzle outlet 104 and a first pair of profilometers 210a and 210b mounted to a bottom surface of the printing assembly according to another embodiment. Nozzle 101 is secured to the printing assembly 100 so that if the printing assembly 100 moves, the nozzle 101 moves in unison with the printing assembly 100. The nozzle 101 is configured with a nozzle outlet 104 at a distal end of the nozzle, and the nozzle 101 radially surrounds a central axis 106. Bead 5a is extruded having a cross-section midpoint aligned with the central axis 104. Mounted on a lower surface of the printing assembly 100 is the first pair of profilometers 210a and 210b. Shown in FIG. 12 bottom perspective view, the profilometers 210a and 210b are mounted to a circular member 260 that is configured to rotate 262 around nozzle 101, and specifically the substantially vertical central axis 106 of nozzle 101. Moreover, the mounting bracket 268 of each profilometer 210a and 210b rotate in unison on the rotatable member 260 similar to the rotatable mounting bracket 268 shown in FIG. 10. Using two profilometers 210a and 210b allow more of the lateral surface in the x-dimension to be registered to depict more accurately bead tear per unit length along the longitudinal axis 202 in the y-dimension, as shown in the three-dimensional point cloud of FIG. 14b.

Figure 12:
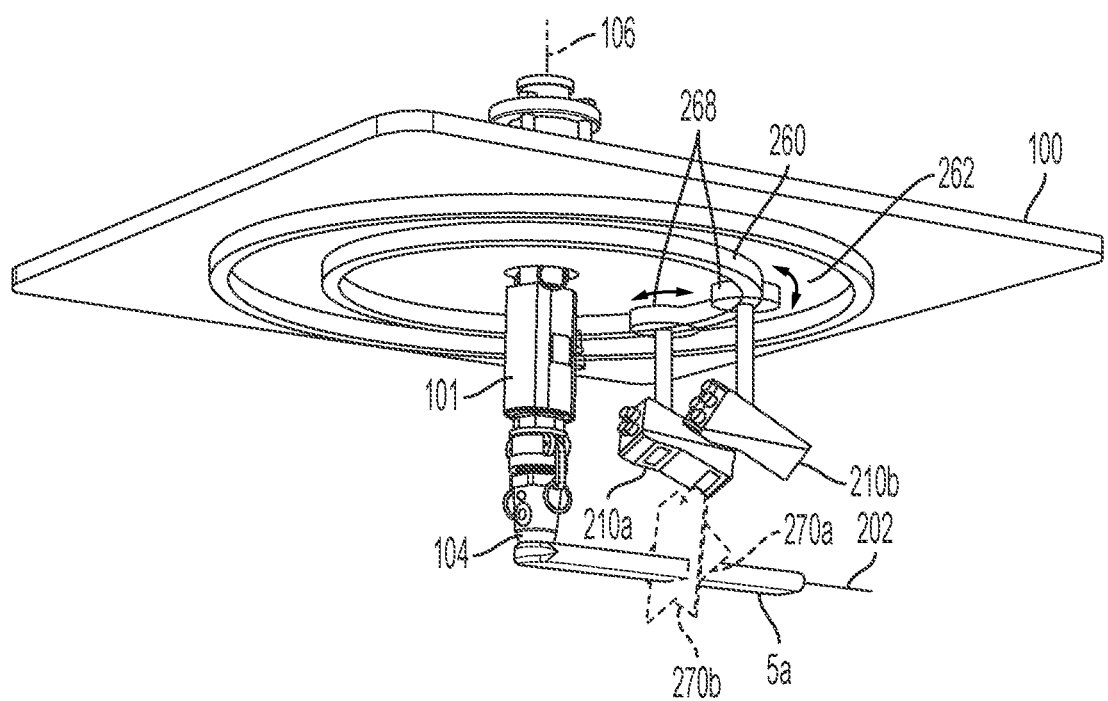
FIG. 12 is a bottom perspective view of the nozzle, nozzle outlet and the first pair of profilometers mounted to the printing assembly such that the first pair of profilometers are rotatable in unison a spaced distance apart around a central axis of the nozzle.

The light emitted from each of the profilometers 210a and 210b emit a collimated light ray as respective lines 270a and 270b. The rays that form lines 270a and 270b are co-planar to each other across a cross section of bead 5a to depict, by camera 220, a two dimension cross section slice of bead 5a. As the nozzle 101 moves with the printing assembly 100 parallel to and above the longitudinal axis 202 of the forming bead 5a, the camera 220 along with the signal processor computes a three-dimension point cloud described below in reference to FIG. 14b. Profilometers 210a and 210b must rotate on printing assembly 100 as the nozzle 101 changes direction so that the first pair of profilometers 210a and 210b will always trail the midpoint of the forming bead 5a and remain centered along the longitudinal axis 202 in the new direction. As shown in FIGS. 11 and 12, the corresponding lines 270a and 270b are angled inward from the pair of profilometers 210a and 210b that are rotated so that the profilometers always remain spaced an equal distance perpendicular to and outside the longitudinal axis 202 of bead 5a. If a single profilometer is used, such as shown in FIGS. 9 and 10, profilometer 210 remains directly above and travels along the longitudinal axis 210 and is not displaced perpendicular from a line that is above and parallel to longitudinal axis 210. If two profilometers 210a and 210b are used, however, the pair of profilometers 210a and 210b are displaced perpendicular from a line that is vertically directly above and parallel to the longitudinal axis 202. Moreover, the profilometers 210a and 210b must be angled inward to project the rays toward the longitudinal axis 202 so that the midpoint of the rays are directed to a midpoint of the cross section of the bead 5a being formed and remain along the longitudinal axis 202 at the midpoint for reasons described when comparing FIG. 13a to FIG. 14a.

Figure 13A:
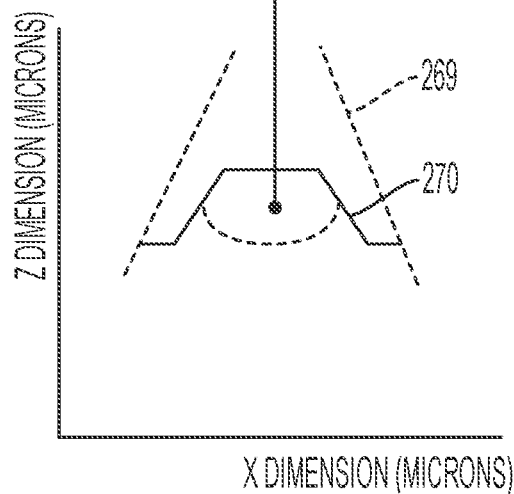
FIG. 13*a* is a two dimensional point cloud profile of a cross section of the bead measured by the single profilometer arranged according to FIGS. 9 and 10.
Figure 13B:
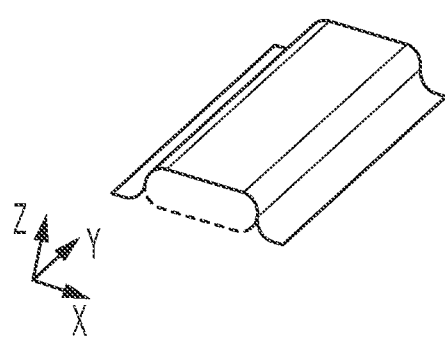
FIG. 13*b* is a three dimensional point cloud profile of the bead measured by the single profilometer arranged according to FIGS. 9 and 10.

Turning now to FIG. 13a, the two dimensional ray 270 from a single profilometer 210 embodiment of FIGS. 9 and 10 provides a line of collimated light 270 across a cross-section of a bead. Since the midpoint of the profilometer 210 is vertically directly above the cross-section midpoint of the bead 5a, the two-dimensional line will not depict the curved lateral surface. As the profilometer is drawn along a line directly above and not offset from the longitudinal axis 202 of the bead 5a, a three dimensional point cloud is produced from the signal processor 230 (FIG. 7) as shown in FIG. 13b. It would be more desirable to more accurately depict the lateral curved surfaces using at least two profilometers 210, such as that shown in FIGS. 11 and 12, and also in FIGS. 15 and 16.

Figure 14A:
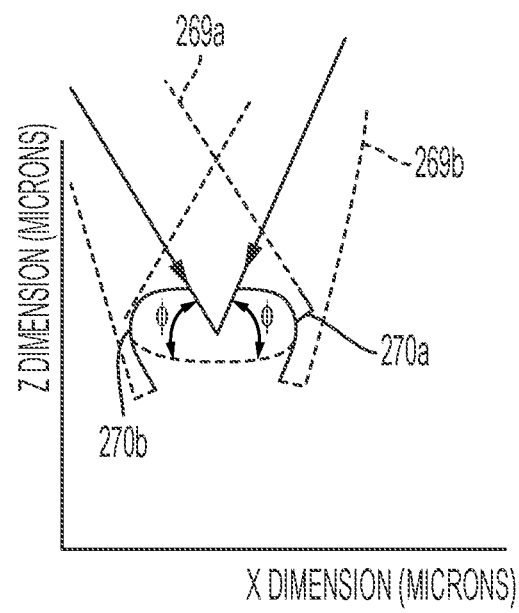
FIG. 14*a* is a two dimensional point cloud profile of a cross section of the bead measured by the first pair of profilometers arranged according to FIGS. 11 and 12.
Figure 14B:
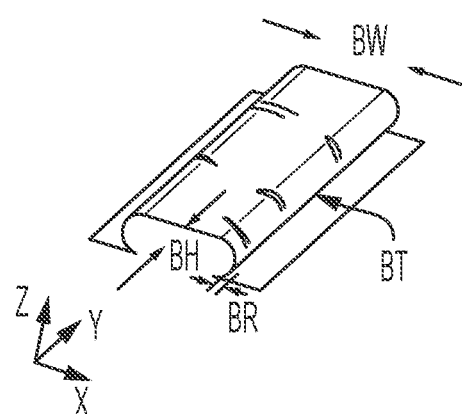
FIG. 14*b* is a three dimensional point cloud profile of the bead measured by the first pair of profilometers arranged according to FIGS. 11 and 12.

In FIGS. 14a and 14b, according to another embodiment, two two-dimensional rays 269a and 269b provide respective lines of collimated light 270a and 270b across a cross-section of the bead. Since the midpoint of the profilometers 210a and 210b, and their rays, are offset perpendicular from a line that is vertically directly above the longitudinal axis 202, the lines 270a and 270b (when combined by signal processor 230) depict more of the lateral surfaces of bead 5a. The profilometers 210a and 210b project rays of collimated light not only co-planar to each other but the rays 269a and 269b are depicted with respective midpoints such that the rays of collimated light are preferably at substantially similar angles Φ inward toward the longitudinal axis 202 and relative to the lines as well as the planar surface as shown in FIG. 14a.

Figure 15:
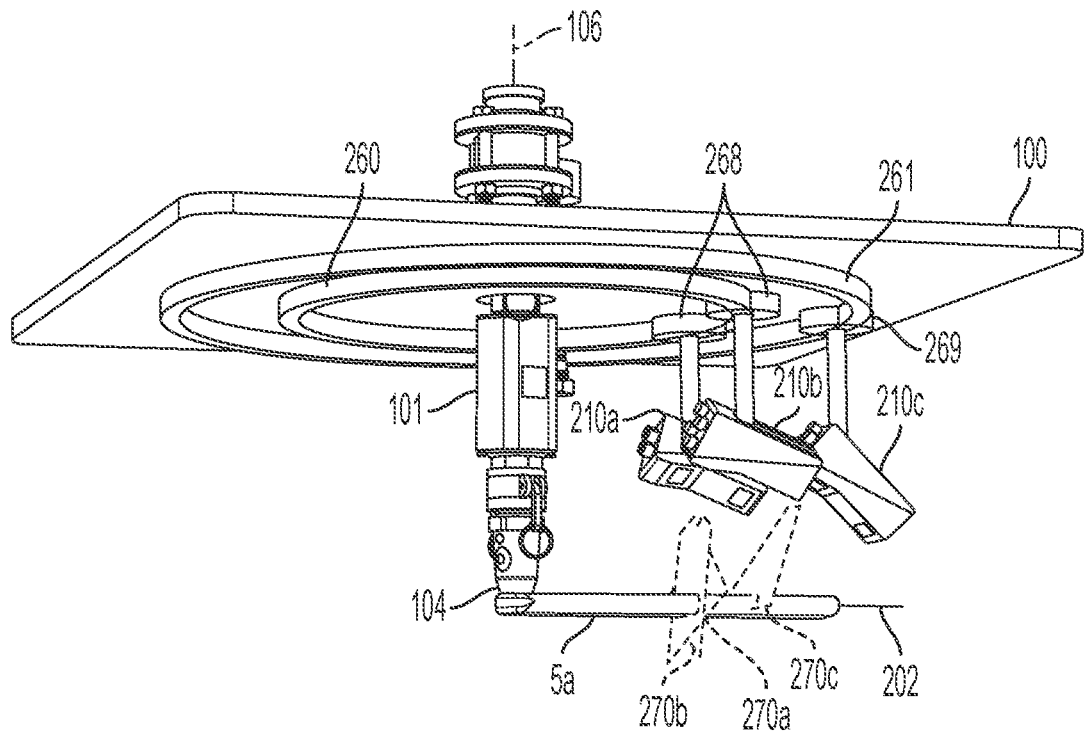
FIG. 15 is a bottom perspective view of the nozzle, nozzle outlet and a first pair of profilometers and a second profilometer mounted to a bottom surface of the printing assembly such that the first pair of profilometers are rotatable in unison around a central axis of the nozzle in advance or in unison with rotation of the second profilometer spaced a radial distance from the first pair of profilometers and between the first pair of profilometers.
Figure 16:
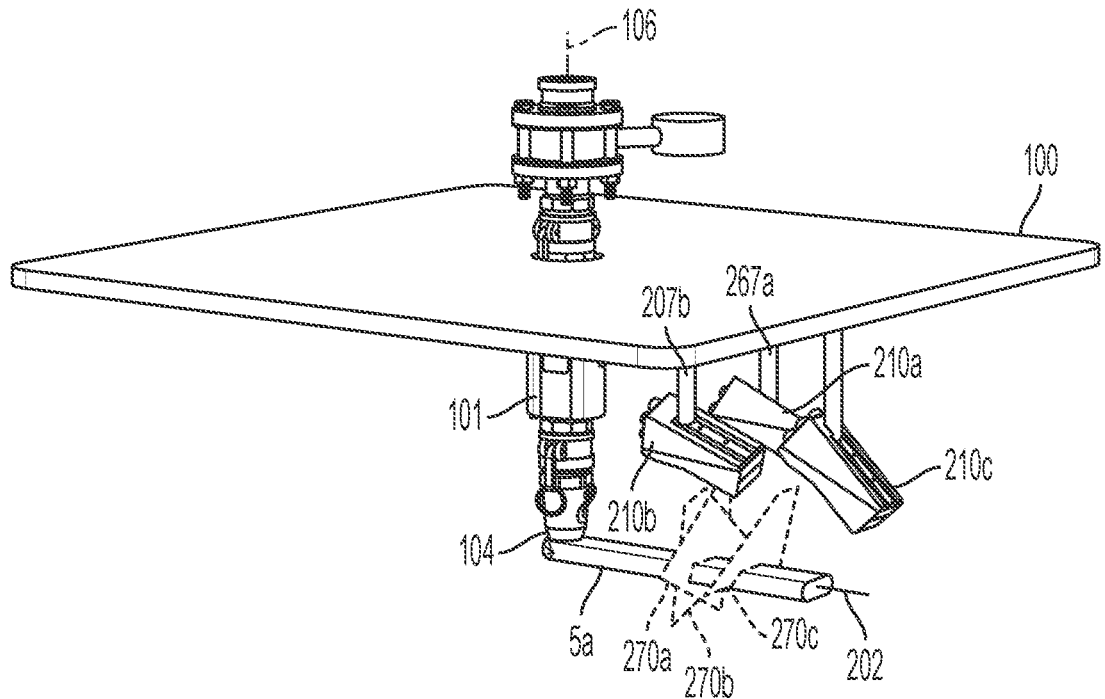
FIG. 16 is a top perspective view of the nozzle, nozzle outlet and the first pair of profilometers and the second profilometer mounted to the bottom surface of the printing assembly.

FIGS. 15 and 16 illustrate, according to another embodiment, a pair of first profilometers 210a and 210b, along with nozzle 101, mounted on printing assembly 100. Profilometers 210a and 210b are rotatable about central axis 106 in unison with each other on member 260, and also are rotatable on respective members 268 about respective vertical axes of mounting arms 267a and 267b. A second profilometer 210c is also mounted to printing assembly 100 and is rotatable about the central axis 106 on rotatable member 261. Member 261 is spaced radially outward from member 260 so that the second profilometer 210c is spaced radially further outward from and between the pair of first profilometers 210a and 210b. The second profilometer 210c projects a collimated line substantially parallel to the planar surface on which the bead 5a is formed, and behind the co-planar rays and associated lines 270a and 270b emitted by the pair of first profilometers 210a and 210b. As the bead 5a is formed, the lines 270a and 270b reflected from bead 5a are detected first to generate a three dimensional point cloud as the printing assembly 100 moves along with the extrudable material being formed along the longitudinal axis 202. While bead geometry and surface texture can be determined more accurately using two profilometers 210a and 210b, bead roll cannot.

Bead roll is determined over time. If there is too much water in the dry admixture, the sides of the bead 5a will "roll" outward in a direction perpendicular to the longitudinal axis 202 before it cures in place. The second profilometer 210c can detect the amount of roll or lateral spread relative to (and subsequent to) the measurements taken by the first pair of profilometers 210a and 210b. Thus, the second profilometer 210c must measure after the pair of first profilometer 210a and 210b readings to obtain an accurate amount of bead roll. Moreover, to take measurements in any direction at which the bead 5a is formed on a wall surface, the first profilometers 210a and 210b, and the second profilometer 210c, rotate in a coordinated fashion to maintain the lines 270a, 270b and 270c across the cross-section of a bead 5a formed in different horizontal directions.

Figure 17:
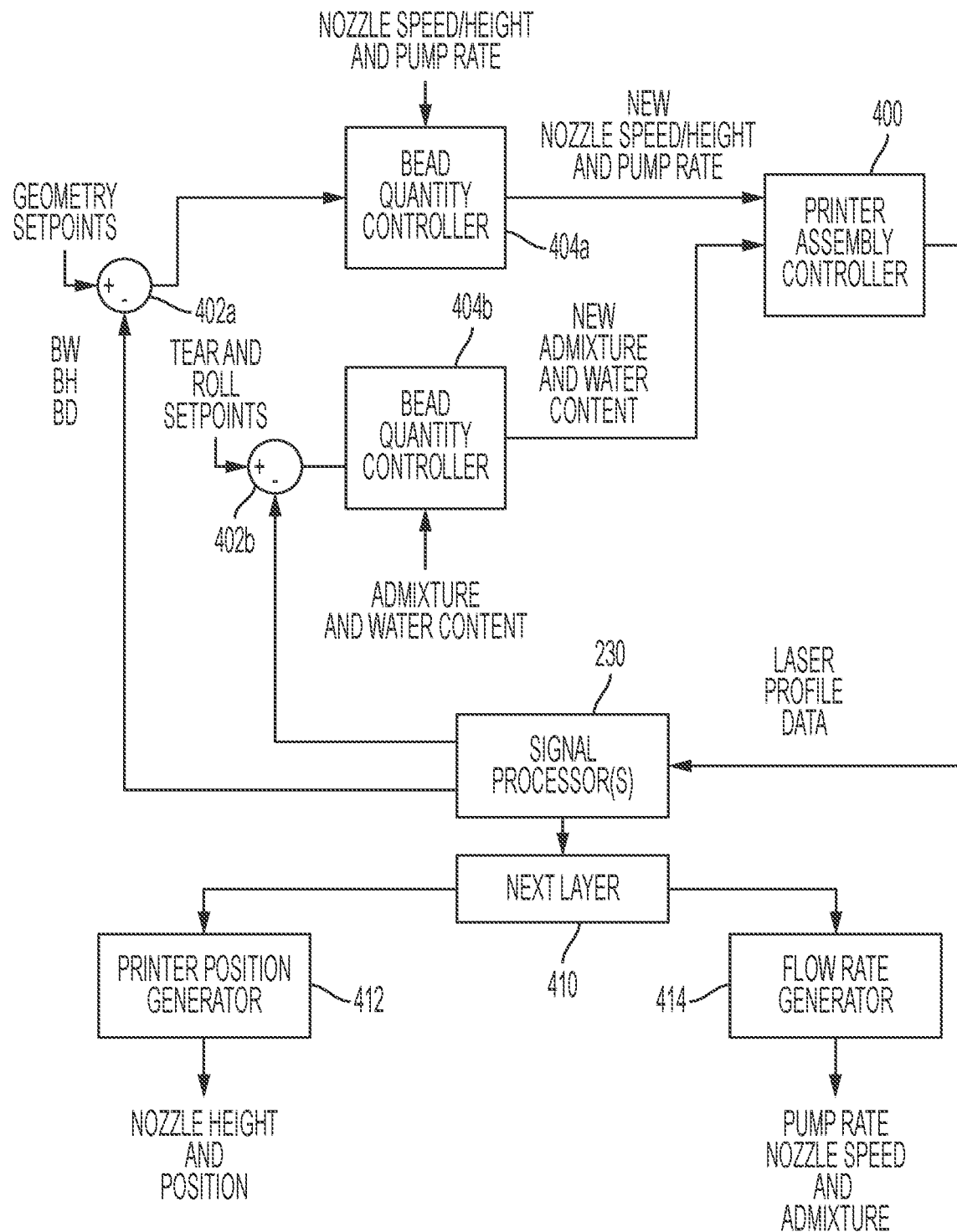
FIG. 17 is a block flow diagram of a feedback control loop method for controlling the geometric outer surface configuration and placement of additive layers of elongated beads of extrudable building material to the wall surface of the structure.

FIG. 17 describes the method or process for controlling the geometric cross-section of a bead using a feedback control loop. In particular, as the printer assembly controller 400 moves the printer assembly, the nozzle and one or more profilometers along the extruded longitudinal axis of the bead. Profile data is taken by the laser detector of the profilometer(s). One or more signal processors 230 within or outside of the profilometers receives the laser profile data and measures the cross-section of the bead as it is being formed along the longitudinal axis. The measured cross-section is the geometric cross section of the bead taken at regular and periodic intervals along the longitudinal axis, wherein the geometric cross section comprises bead width (BW), bead height (BH), bead displacement (BD), bead tear (BT) and bead roll (BR). One or more comparators 402a, 402b, etc. compare the periodically measured geometric cross sections of the bead to a predetermined target cross section (or setpoints) of BW, BH, BD, BT and BR. Depending on the comparing, one or more bead quantity and bead quality controllers 404a and 404b, respectively, change the printer assembly operation. For example, a bead quantity controller 404a receives the BW, BH and BD comparison outputs and changes the speed at which the nozzle moves, changes the height (or displacement) of the nozzle above the surface and/or changes the pump rate at which the building material is extruded. A new nozzle speed command, a new nozzle height command and a new pump rate command is then sent to the printer assembly controller 400 based on the change amount. The same occurs in, for example, a bead quality controller 404b. Bead quality controller 404a receives the BT and BR comparison outputs and changes the admixture amount of, for example, dry cement or concrete, the water content going into the mixing unit, or the ratio of dry admixture to water. A new admixture and water content is sent to the printer assembly controller 400 based on that change amount. The process is continued in a closed loop process at periodic intervals to change the geometric cross section, texture, viscosity, etc. of the bead as it is being formed. Moreover, the process can be continued and modified for each new layer 410 of extruded building material, or each new longitudinal axis direction of that layer. A printer position generator 412, or controller, can send control signals for that next layer to change the nozzle height and position. A flow generator 414 can send control signals for the next layer to change the pump rate, nozzle speed and admixture of the next layer.

In the manner described, systems and methods for designing and constructing a structure via closed loop three dimensional printing have been described. In some embodiments, the above described methods and systems may be utilized with any one of the constructions systems previously described herein to construct a structure through layer-by-layer application of a bead to a wall surface of the structure. Accordingly, by use of the systems and methods disclosed herein, the time and materials required to construct a structure may be reduced and the applied bead can be geometrically controlled as it is being applied.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

The invention claimed is:

1. A system configured to construct a structure, comprising:
   a printing assembly movably disposed on a gantry above a surface;
   a nozzle mounted on the printing assembly, wherein the nozzle comprises an outlet through which extrudable building material exits to form a bead having a longitudinal axis about which the bead is formed and substantially parallel to and above the surface;
   a profilometer mounted on the printing assembly and comprising:
      a laser emitter configured to project a line of collimated light across at least a portion of a cross-section of the bead perpendicular to the longitudinal axis; and
      a camera configured to collect the collimated light reflected from the bead as the nozzle mounted to the printing assembly is moved along the longitudinal axis wherein the profilometer is mounted on a lower surface of the printing assembly, the profilometer is mounted to a circular member that is configured to rotate around nozzle, and the profilometer comprises a mounting arm secured to a member that is rotatably secured to the circular member and rotates around a substantially vertical central axis of the mounting arm.

2. The system of claim 1, further comprising a comparator configured to compare:
   (i) a number of tears to a predetermined target tear amount, and
   (ii) the lateral roll of the bead to a predetermined target roll amount.

3. The system of claim 1, further comprising a bead quality controller configured to change an admixture and a water content of the extrudable building material that exits from the outlet.

4. The system of claim 1, wherein a direction of the longitudinal axis is changeable depending on a wall layout of the structure.

* * * * *